March 1, 1949.   J. T. KING   2,462,974
FISHING REEL
Filed Jan. 20, 1945   2 Sheets-Sheet 1
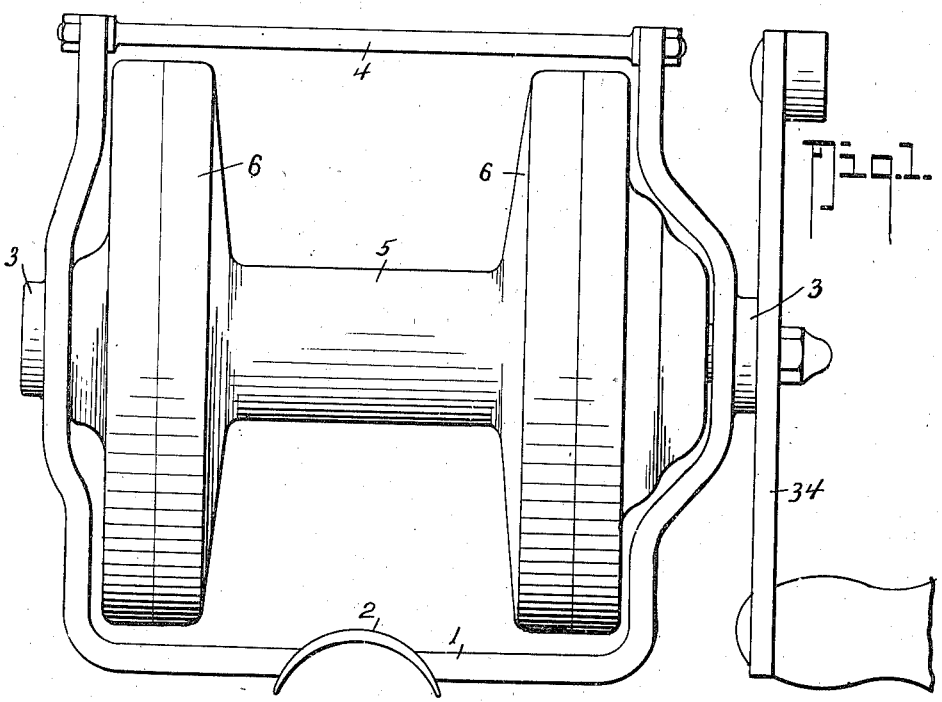
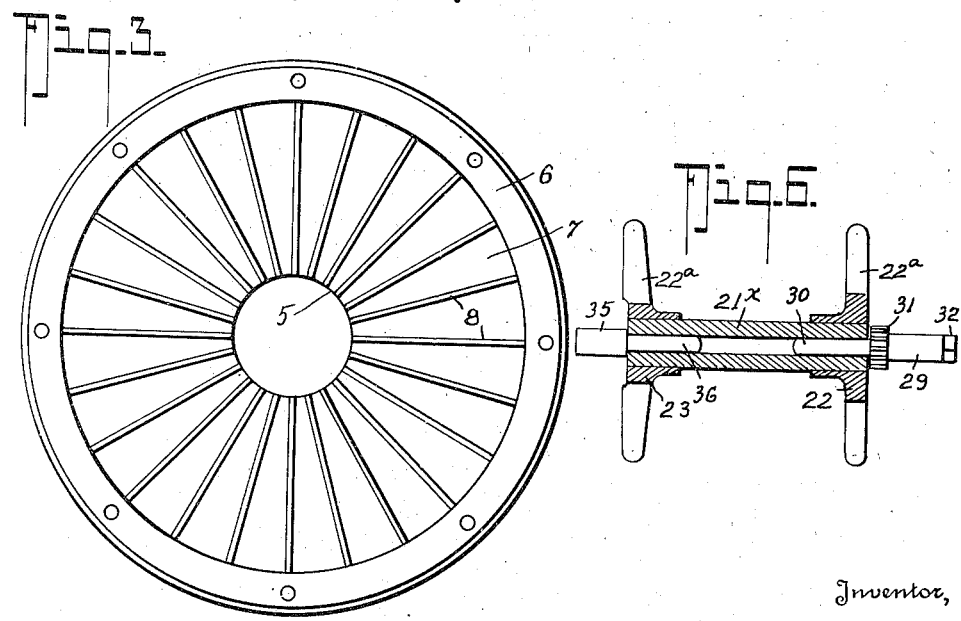
Inventor,
James T. King,
By Albert E. Dieterich,
Attorney.

March 1, 1949.　　　　J. T. KING　　　　2,462,974
FISHING REEL

Filed Jan. 20, 1945　　　　　　　　　2 Sheets-Sheet 2

Inventor,
James T. King,
By Albert E. Dieterich,
Attorney.

Patented Mar. 1, 1949

2,462,974

UNITED STATES PATENT OFFICE 2,462,974

FISHING REEL

James T. King, Burbank, Calif.

Application January 20, 1945, Serial No. 573,710

2 Claims. (Cl. 242—84.7)

My present invention relates to fishing reels having hydraulic drives, such, for example, as that disclosed in my Patent No. 2,389,515 issued November 20, 1945.

Primarily the present invention has for an object to provide a more perfectly balanced reel, one in which, when speed reduction gearing is in use, has the gearing disposed adjacent the crank, and one in which the entire structure of the reel is rotatably mounted as a unit in a yoke frame which has the saddle for mounting on a pole.

Another object is to provide a reel in which a dual set of vanes is provided, one set at either side of the reel.

Again it is an object to provide a reel of the character stated, so constructed that it can be easily and cheaply manufactured.

A further object is to provide a structure in which the reel can be quickly removed from its yoke for inspection and repairs if necessary.

Again it is an object to provide means for effecting a hydraulic drive at both sides of the spool, operated by a crank located at one side only.

Other objects will in part be obvious and in part be pointed out hereinafter.

To the attainment of the aforesaid objects and ends, the invention also resides in those novel details of construction, combination and arrangement of parts all of which will be first fully described and then be specifically pointed out in the appended claims reference being had to the accompanying drawings in which:

Fig. 1 is an elevation of a fishing reel embodying my invention.

Fig. 3 is a side elevation of the spool, per se, looking from right to left in Fig. 1.

Fig. 6 is a detail view of a modification.

Figure 2:
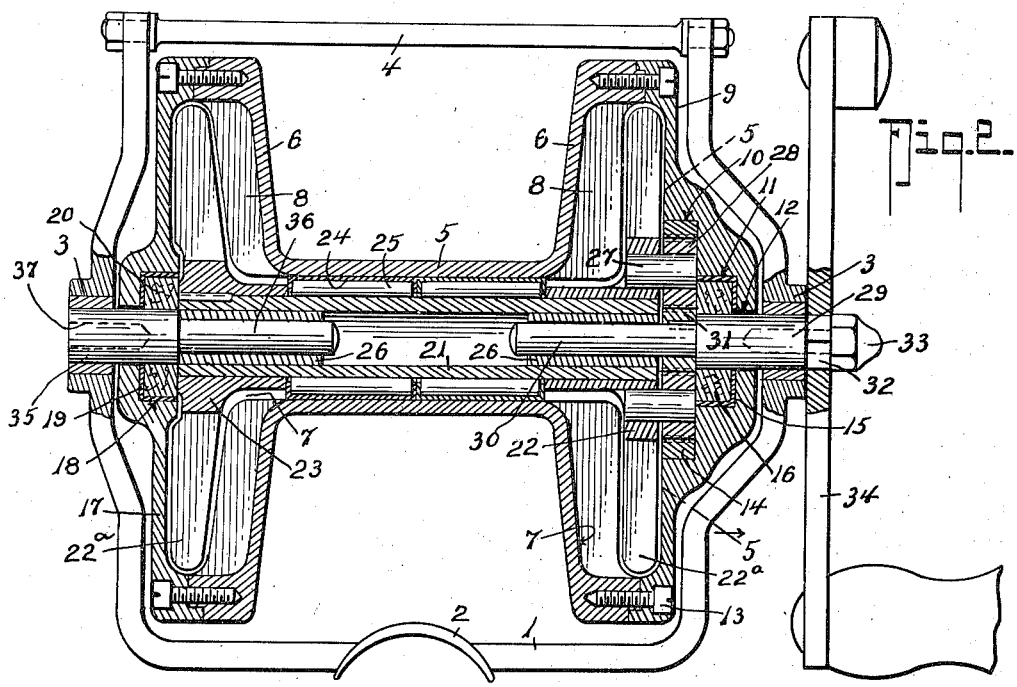
Fig. 2 is a central vertical longitudinal section and part elevation of the same.
Figure 4:
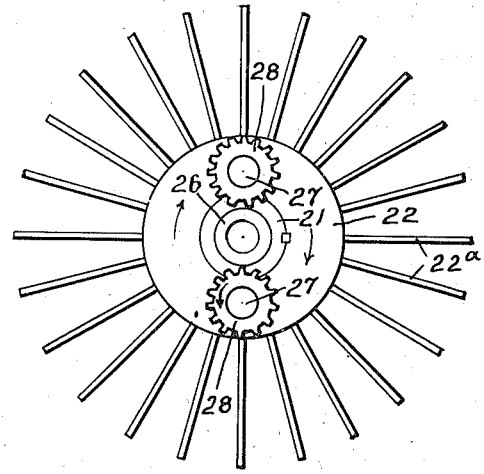
Fig. 4 is a detail end elevation of the right hand driving impeller and pinions carried thereby.
Figure 5:
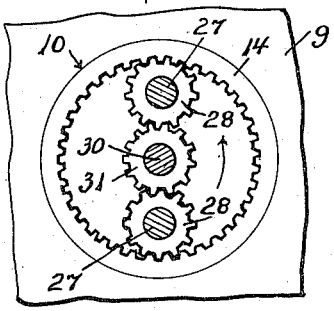
Fig. 5 is a detail section on the line 5—5 of Fig. 2.

In the drawings in which like numerals of reference indicate like parts in all the figures, 1 represents the yoke-frame having a suitable saddle 2, brace rod 4, and shaft bearings 3.

The spool 5 is mounted in the yoke-frame and comprises sides 6 each being hollow to provide one half of each of two end chambers 7 the other halves of which chambers 7 are formed in caps 9 and 17 respectively. The caps 9 and 17 are lap-jointed and secured together by countersunk screws 13. Each spool side 6, within the chambers 7 is provided with radial vanes 8 preferably integrally formed with the spool and co-operating with driving vanes 22ª on driving hubs 22 and 23.

The cover 9 has a recess 10 for a ring gear 14, a recess 11 for a packing ring 16 and its cage 15, and an opening 12 for the drive shaft 29. The cover 17 has a recess 18 for the packing 20 and its cage 19.

21 indicates a hollow shaft having bushings 26 tightly fitted into its ends and having the driving impellers 22, 23 secured rigidly on its ends. Bearing rollers 25 ride on the shaft 21 between the sleeves of the driving impellers, the cages 24 abutting each other and the adjacent ends of the said sleeves as shown in Fig. 2, the cages tightly fitting the inner wall of the spool 5.

Tightly fitted in bores in the driving impeller 22 are stub shafts 27 carrying pinions 28 that mesh with the ring gear 14 and with a driving pinion 31 on the reduced portion 30 of the short drive shaft 29. A crank 34 is fitted on the squared end 32 of the shaft 29 and held in place by a cap screw 33.

A short shaft 35 has a reduced portion 36 held in the bushing 26 on the end of shaft 21 remote from the shaft portion 30. The shafts 29 and 35 are held to turn in the bearings 3 of the yoke-frame. The shaft portion 36 may have a driving fit in its bushing 26.

A threaded hole 37 is provided in the outer end of shaft 35 to receive a screw (not shown) by means of which the shaft may be pulled when it is desired to remove the spool from the yoke.

In operating the reel the necessary braking of the line and its reeling in is accomplished, as in the reel of my application aforesaid, by turning the crank faster or slower as desired.

If desired the gearing may be omitted and shaft 30 keyed to turn with bushings 26 to effect a direct drive of the impellers 22 and 23.

Furthermore, if desired the bushings 26 may be omitted and the shaft 21x designed to receive the reduced ends 30 and 36 directly as indicated in Fig. 6.

From the foregoing description taken with the accompanying drawings it is thought the construction, operation and advantages of my invention will be clear to those skilled in the art to which it relates.

What I claim is:

1. In a fishing reel: a supporting frame having two spaced-apart bearings; a hollow spool composed of a central section and two sides, said sides each enclosing a liquid and impeller chamber and having therein vanes integral with the spool; a driving impeller with vanes in each of said chambers; means connecting said driving impellers together to turn within the spool in unison; means including shafts for mounting said spool to turn freely in said bearings, one of said shafts constituting a drive shaft; said sides each including a removable cover through which said shafts project, one of said covers having a gearing-receiving recess; means including power transmitting gearing located in said recess between said drive shaft and said driving impellers; means operatively connecting said drive shaft with said driving impellers; and a liquid within said chambers.

2. In a fishing reel: a yoke-frame having a saddle and two shaft bearings; a hollow spool having two end chambers and removable chamber covers, said covers having shaft openings and recesses for packing; two shafts mounted one in each shaft-bearing of the yoke; a hollow shaft having a bushing in each end to receive said shafts, said shafts passing through said shaft openings of the covers and into said bushings; packing means in said recesses of the covers through which packing means said shafts also pass; said spool having integral vanes within each of said chambers; a driving impeller secured on said hollow shaft within each of said chambers and having vanes to co-operate with said integral vanes; one of said covers having a gearing-receiving recess; at least one pinion carried by the driving impeller which is adjacent said gearing-receiving recess; a ring gear securely held in said gearing-receiving recess and meshing with said opinion; one of said two shafts constituting a drive shaft and a drive gear on said drive shaft and meshing with said opinion; and a liquid within each of said chambers for co-operation with said vanes.

JAMES T. KING.

REFERENCES CITED

The following references are of record in the file of this patent:

UNITED STATES PATENTS

| Number | Name | Date |
|---|---|---|
| 2,185,498 | Carson et al. | Jan. 2, 1940 |
| 2,351,654 | Anderson | June 20, 1944 |
| 2,389,515 | King | Nov. 20, 1945 |